May 19, 1959 T. H. ROSE 2,886,852
PROCESS FOR OBTAINING MEASUREMENTS OF INACCESSIBLE
INTERIOR DIMENSIONS IN CASTINGS
Filed May 11, 1954
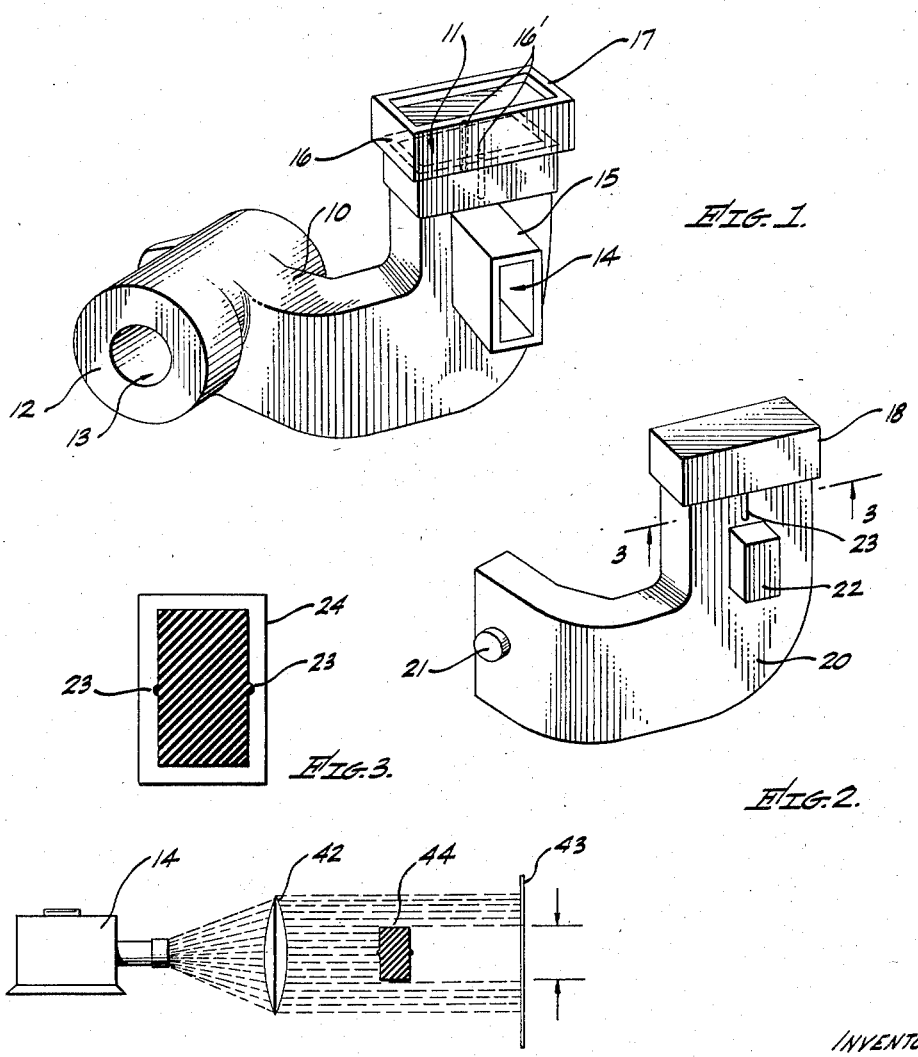
INVENTOR.
THOMAS H. ROSE,
BY Henry Huyman
ATTORNEY.

United States Patent Office 2,886,852
Patented May 19, 1959

2,886,852

PROCESS FOR OBTAINING MEASUREMENTS OF INACCESSIBLE INTERIOR DIMENSIONS IN CASTINGS

Thomas H. Rose, Los Angeles, Calif., assignor to Hughes Aircraft Company, Culver City, Calif., a corporation of Delaware Application May 11, 1954, Serial No. 428,888

1 Claim. (Cl. 18—47.5)

This invention generally relates to the art of examining the configuration and condition of interiors of castings, and more specifically to the production of a negative replica of the interior of castings by means of an elastomer.

Facilities heretofore known have been inadequate for accurately inspecting the dimensions of inaccessible interiors of castings which have most rigid requirements as to interior dimensions, interior configurations and interior surface conditions, such as, for example, waveguides. Where the interior of the casting is inaccessible from the outside, reliance has had to be placed on destructive sample testing, i.e., a sample device is broken up, so that inspection and measurements of the interior dimensions can be made directly.

Prior art methods of inspecting interior surfaces of castings for defects have been used which are restricted to the examination of the condition of tubular surfaces, such as rifling grooves in gun barrels, blow holes in pipes, etc. An example of such a method comprises introducing a sheet of thermoplastic material, rolled into a cylindrical form, into the interior of the tubular part to be inspected for surface defects. An expandable core is then introduced into the thermoplastic cylinder and expanded under fluid or air pressure to cause the outer surface of the thermoplastic cylinder to take on an imprint of the interior surface of the tubular part. The thermoplastic material is then heated by a heating element in the expandable core which exerts the pressure. Thereafter, the cylinder is deflected and withdrawn and the thermoplastic cylinder permitted to cool and harden to form an elastic negative. Because of its elastic properties, the cylinder can be forcibly removed, and visual inspection of the outer surface of this plastic negative reveals the condition of the interior surface of the tubular part. However, due to the necessity of using an expandable core, such a method is not applicable to the interior of castings except those of simple tubular shape. Furthermore, the method is undesirably complicated and its usefulness primarily limited to visual inspection for surface defects.

It is therefore an object of this invention to provide a method of producing a plastic negative of the interior of castings with which accurate measurement of the interior dimensions of the castings can be obtained.

It is another object of this invention to provide a simple method for producing a solid negative of an interior opening in a casting to obtain information about the dimensions, unevenness, flaws, and other defects of such interiors.

It is still another object of this invention to obtain a negative reproduction of the interior of a casting without the use of auxiliary mechanical or electrical forming aids, pressure devices, heating elements, etc.

It is still a further object of this invention to provide an inspection method which can be applied to the interior of castings which contain corners, lands, ducts, shoulders and other configurations which have heretofore not been capable of inspection, except by destruction inspection.

In its essence, the technique of this invention consists of the preparation of a cast negative of the interior of the casting by plugging up all openings but one, pouring a plastic material in liquid form into the casting, and permitting the plastic to solidify. The solidified plastic material has sufficient elasticity to permit its forcible withdrawal from the casting after it is solidified. The process of solidifying the liquid plastic material depends upon the properties of the particular material used and can be accomplished either by cooling, by heating, or with the addition of a catalyst. Visual inspection of the cast negative will reveal surface defects at a glance. For exhaustive inspection to determine the actual dimensions, angularities, contour mismatches, waviness, parting-line flush, etc., the aid of an optical comparator (shadowgraph) may be employed. For convenient measurements with the comparator, the cast negative may be sliced into sections.

The novel features which are believed to be characteristic of the invention, both as to its organization and method of operation, together with further objects and advantages thereof, will be better understood from the following description considered in connection with the accompanying drawings, in which an embodiment of the invention is illustrated by way of example. The scope of the invention is pointed out in the appended claim. In the drawing, Fig. 1 is a perspective view of a waveguide casting for the purpose of explaining the process of this invention;

Fig. 2 is a perspective view of the negative replica of the casting shown in Fig. 1 obtained by the process of this invention;

Fig. 3 is a cross sectional view taken along the line 3—3 of Fig. 2; and

Fig. 4 is a schematic diagram showing a method of optically measuring the dimensions of the section shown in Fig. 3.

Referring to the drawing, which is made a part of this specification, Fig. 1 shows a typical example of a casting 10 having an interior which is somewhat inaccessible from the outside. By means of this invention, the interior surfaces can be inspected for defects and all interior dimensions can readily be measured.

The casting 10 comprises a rectangular waveguide duct 11 which starts at a surface 16 and ends in the cylindrical boss 12. In the center of the boss 12 is a cylindrical opening 13 which extends through the boss 12. A branch duct 14 of rectangular cross section is contained inside a rectangular boss 15 and passes through one side wall of the casting 10. At the entrance end of the rectangular waveguide duct 11 are two symmetric grooves 16' which extend a short distance down into the main duct 11 from surface 16. A mask or well 17, which may be in the form of a rectangular box, rests on or surrounds surface 16 to provide a liquid-tight well to hold a fluid plastic. Such a well may be made of any suitable material; one example of such a material is an adhesive tape which my be secured to casting 10.

A plastic negative of the interior of casting 10 is made up by pouring the moulding material into the casting after suitably plugging up the openings 13 and 14 and making them liquid-tight. If the casting contains portions or cavities which are not to be reproduced, these are also plugged. The castings should be free from dirt and grease. The moulding material is poured into the rectangular well 17 and duct 11 until it completely fills the casting as well as the well 17. The pouring should be done slowly in a small stream and the casting should be held in such a position as to prevent air entrapment.

The material used for casting the core must have the property of becoming an elastic solid upon curing. Generally speaking, such an elastic solid is called an elastomer, which is defined as "any substance, especially a synthetic polymer, having properties of natural, reclaimed, vulcanized, or synthetic rubber." The word "curing" used here is to define any process whereby the liquid becomes an elastomer and includes, for example, the application of heat or the addition of a catalyst to the liquid.

After curing of the moulding material the well 17 is removed. The portion of the cured material which extends above surface 16 provides a finger grip 18 (Fig. 2) by which the plastic core is forcibly removed from the casting as by gentle pulling aided by a jet of compressed air blown into the cavity around the core.

Referring to Figs. 2 and 3, the cured material removed from casting 10 is the negative replica 20 of the interior of the casting depicted in Fig. 1. In its entirety, the negative replica 20 reveals the configuration and dimensions of the interior of casting 10, the body of the replica 20 representing duct 11, a boss 21 representing opening 13, rectangular boss 22 representing branch duct 14, and two seams 23 representing the grooves 16'. As previously mentioned, finger grip 18 serves as a convenient extension of the casting of the negative replica 20 to aid in its forcible removal from the casting.

Fig. 4 is a schematic diagram showing one possible way of employing sections of the negative replica 20, such as the section illustrated in Fig. 3, to obtain the dimensions of the interior of the casting shown in Fig. 1. An optical system 42 is located between a light source 41 and a screen 43. The section to be measured 44 is placed between the optical system 42, which gives rise to a parallel beam of light to screen 43, which gives rise to shadow image of the section to be measured. The desired dimensions are now obtained by measuring the image 44 on the screen 43.

This new technique of inspecting the interiors of castings which are not readily accessible from the outside will make possible an accurate piece-by-piece inspection of such interiors without resorting to destructive sample inspection. This technique then opens a way for 100% piece inspection of individual castings which have very critical configurations and, therefore, make such inspection necessary. Heretofore, such castings had to be accepted on the assurance basis of destructive testing of a relatively small number of samples, an inspection method which is both economically undesirable and unreliable.

What is claimed is:

A method of providing a readily accessible replica of the intricately shaped interior of a hollow member having more than one aperture in the sides thereof, said method making use of a liquid compound having the property of becoming an elastomer upon curing and said method comprising the steps of sealing all but one of the apertures of the member to provide containment of a liquid therein, providing a liquid tight well structure around the remaining aperture, filling the hollow interior of the member with the liquid compound through the remaining aperture and into the well structure so that the liquid compound is fully introduced into the intricately shaped interior of the hollow member and extends externally into the well structure, curing the liquid compound within the hollow interior of the member to provide a solid but flexible elastomer replica of the hollow interior, within the member, removing said aperture seals and said well structure from the member, gripping the elastomer replica at the protruding portion left at the well structure position and withdrawing the replica from the aperture thereat, and simultaneously directing at least one concentrated air blast between the flexible replica and the adjacent sides of the member, thus to deform and separate the replica from the interior of the member so that it may be removed intact from the member.

References Cited in the file of this patent

UNITED STATES PATENTS

| 2,473,723 | Nelson | June 21, 1949 |
| 2,569,195 | Quetsch et al. | Sept. 25, 1951 |
| 2,606,442 | Raines | Aug. 12, 1952 |
| 2,618,014 | Sawyer et al. | Nov. 18, 1952 |
| 2,635,466 | Roberts | Apr. 21, 1953 |
| 2,662,393 | Rzasa | Dec. 15, 1953 |

FOREIGN PATENTS

| 606,907 | France | Mar. 20, 1926 |